(12) United States Patent
Phelps

(10) Patent No.: US 8,471,900 B1
(45) Date of Patent: Jun. 25, 2013

(54) GOOSENECK HOSE WITH RETRIEVAL CLAWS ADAPTED FOR A CAMERA

(76) Inventor: Gary L. Phelps, Chicago, IL (US)

( * ) Notice: Subject to any disclaimer, the term of this patent is extended or adjusted under 35 U.S.C. 154(b) by 618 days.

(21) Appl. No.: 12/726,644

(22) Filed: Mar. 18, 2010

(51) Int. Cl.
H04N 7/18 (2006.01)

(52) U.S. Cl.
USPC .............................................. 348/85; 348/84

(58) Field of Classification Search
USPC .................. 294/65.5; 348/25–172, 699–702, 348/818–843; 600/140; 606/206; 370/352; 242/405.2
See application file for complete search history.

(56) References Cited

U.S. PATENT DOCUMENTS

| | | | |
|---|---|---|---|
| 4,575,143 A * | 3/1986 | Nast .............................. | 294/65.5 |
| 4,913,369 A * | 4/1990 | Lia et al. ..................... | 242/405.2 |
| 4,963,903 A | 10/1990 | Cane | |
| 5,513,827 A | 5/1996 | Michelson | |
| D375,319 S | 11/1996 | Johnson et al. | |
| 5,941,818 A | 8/1999 | Hori et al. | |
| 6,090,129 A * | 7/2000 | Ouchi ........................... | 606/206 |
| 6,184,923 B1 | 2/2001 | Miyazaki | |
| 6,847,394 B1 | 1/2005 | Hansen et al. | |
| 7,025,333 B1 | 4/2006 | Gianturco | |
| D523,455 S | 6/2006 | Greise et al. | |
| 7,422,559 B2 * | 9/2008 | Kehoskie et al. ............. | 600/140 |
| 2006/0108485 A1 | 5/2006 | Enderle | |
| 2007/0041371 A1 * | 2/2007 | Hattori .......................... | 370/352 |

* cited by examiner

Primary Examiner — Andy Rao

(57) ABSTRACT

A gooseneck hose device comprising a semi-flexible tube; a housing disposed on a first end of the tube, wherein a camera device is disposed in the housing which functions to allow a user to inspect a location, and a retractable claw is disposed in the housing which functions to grab an item in the location; a wire disposed in an inner cavity of the tube, a first end of the wire is attached to the retractable claw and a second end of the wire extends past a second end of the tube; and a gripping means disposed on the second end of the wire for allowing a user to grip and push or pull the wire inside the tube; wherein the camera device is operatively connected to an electrical viewing device via a cord (or Bluetooth®) comprising an adaptor component, the cord being wrapped in a retractable wheel.

6 Claims, 5 Drawing Sheets

GOOSENECK HOSE WITH RETRIEVAL CLAWS ADAPTED FOR A CAMERA

FIELD OF THE INVENTION

The present invention is directed to an inspection and retrieval equipment. More particularly, the present invention relates to a gooseneck hose having attached retractable claws that enable inspection of hard-to-reach places and retrieval of small items.

BACKGROUND OF THE INVENTION

Oftentimes objects such as nuts and bolts may become loose and accumulate in large equipment. Additionally, small objects can become trapped or lost in other small spaces, not necessarily in a piece of large equipment. The present invention features a gooseneck hose with retrieval claws that can allow a user to find a small item in a space and retrieve it. The gooseneck hose is adapted to connect to a camera, such as a mobile phone camera.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
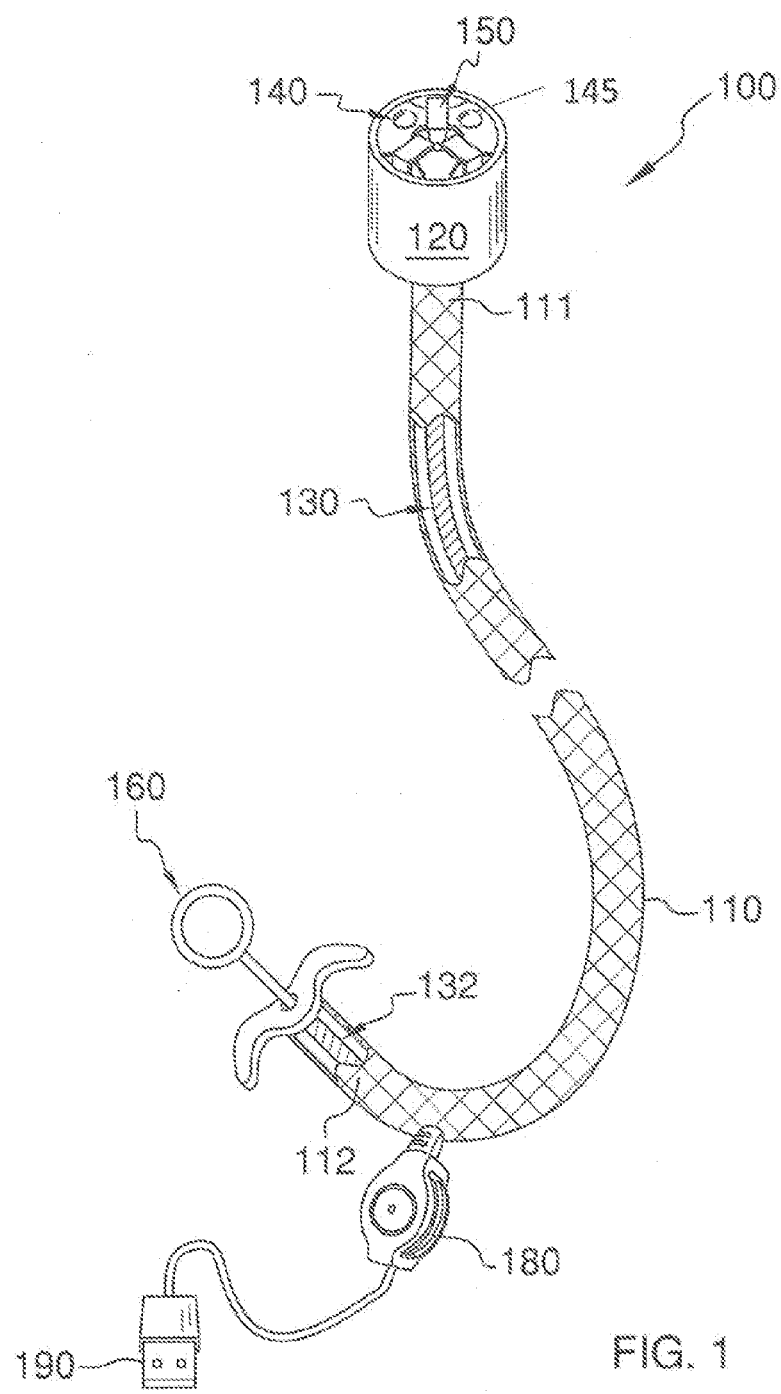
FIG. 1 is a perspective view of the gooseneck hose device of the present invention.
Figure 2:
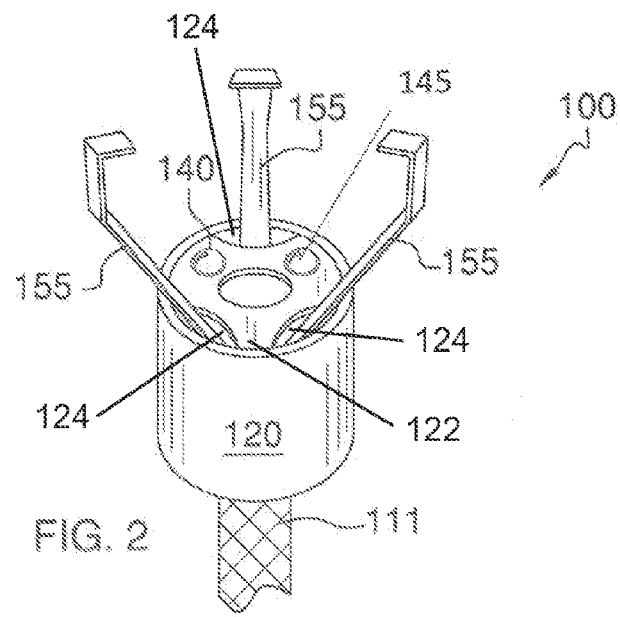
FIG. 2 is a detailed view of the housing of the hose device of FIG. 1.
Figure 3A:
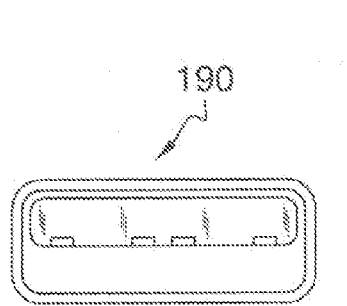
FIGS. 3A-C is a side view of various adaptor components.
Figure 3B:
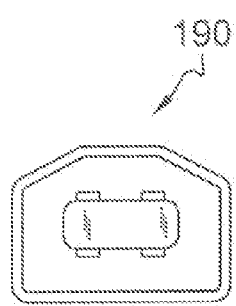
Figure 3C:
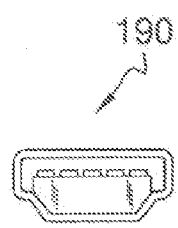
Figure 4:
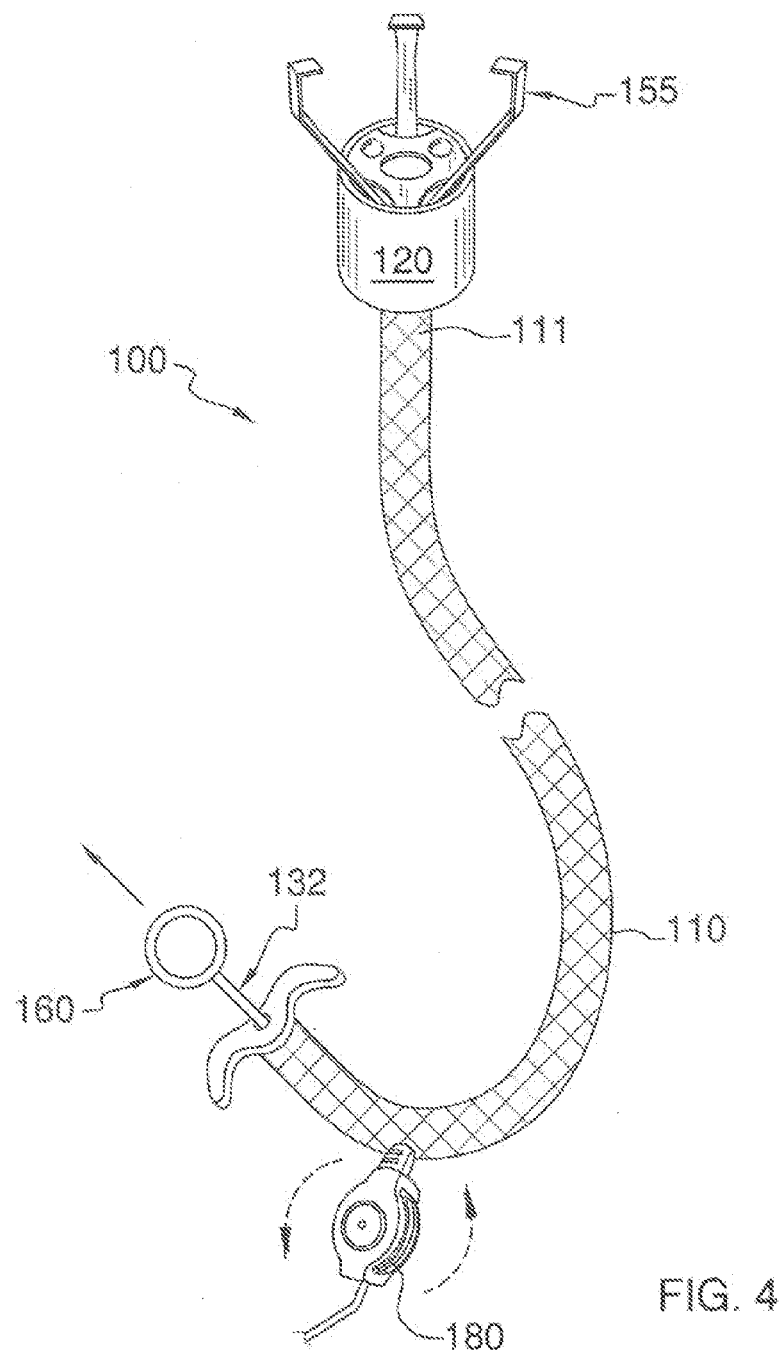
FIG. 4 is a second perspective view of the hose device of FIG. 1.
Figure 5:
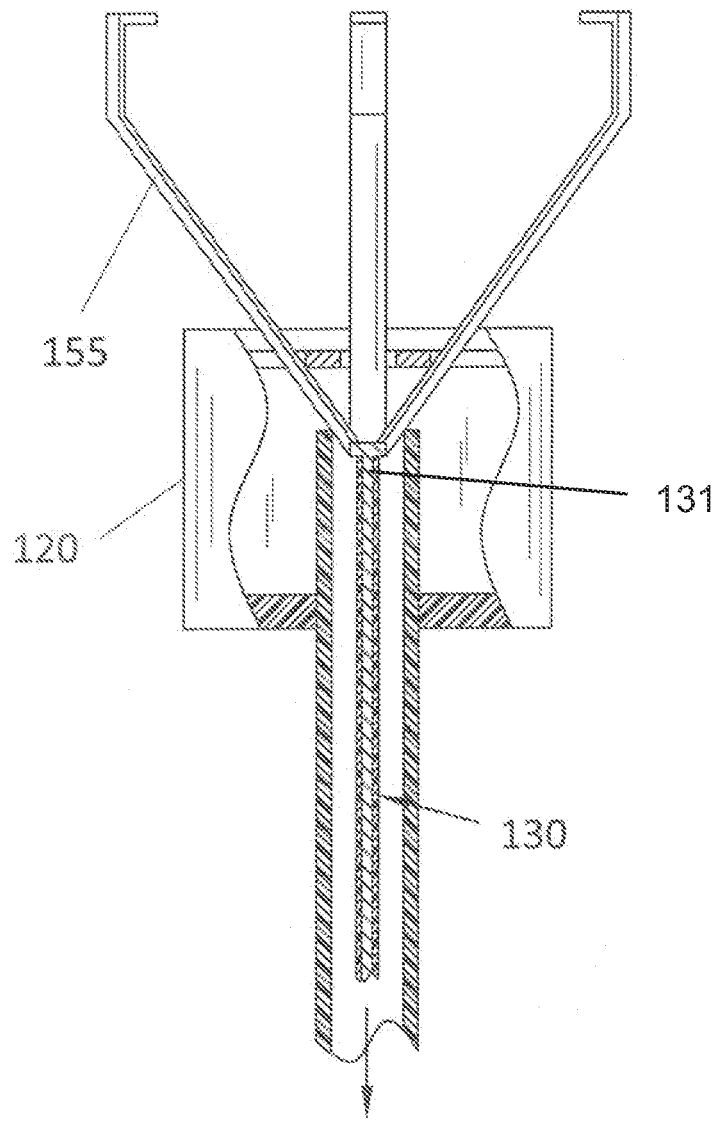
FIG. 5 is a cross sectional view of the hose device of FIG. 1.
Figure 6:
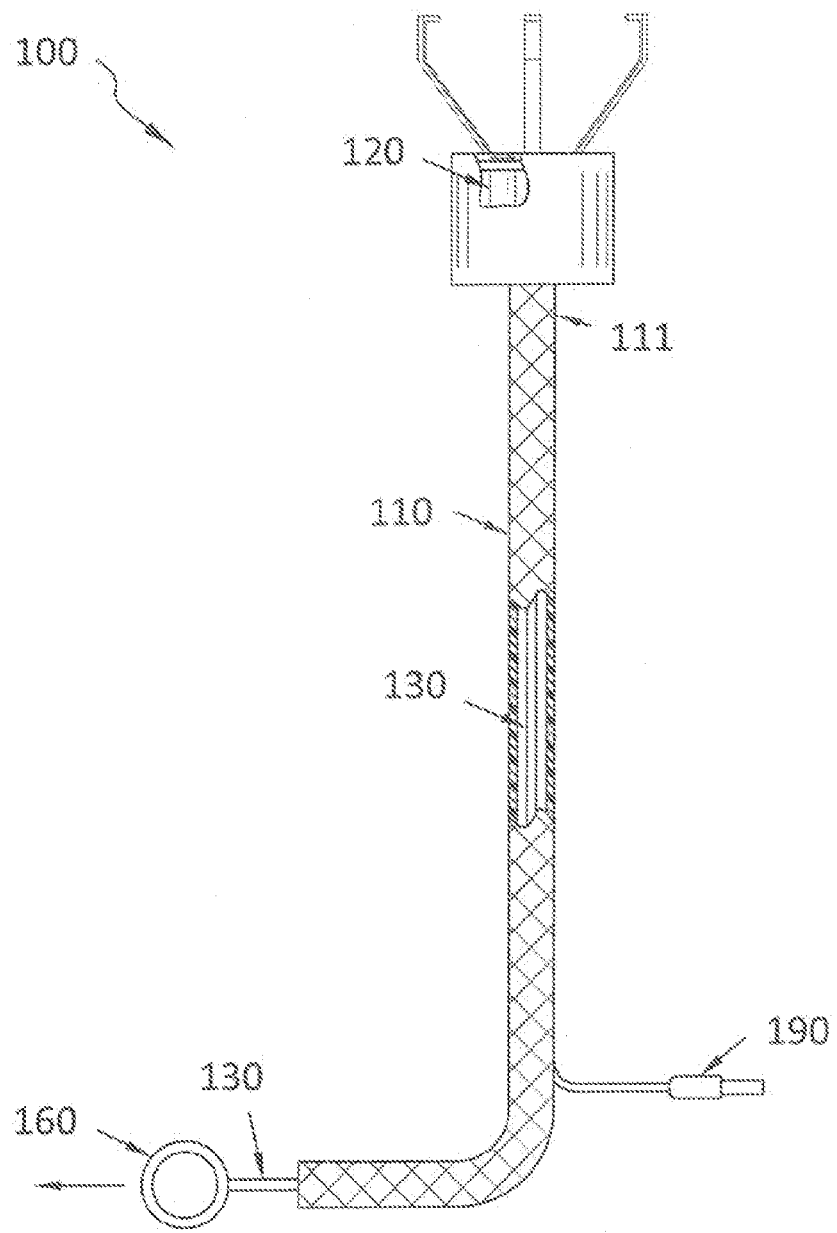
FIG. 6 is a side view of the hose device of FIG. 1.

Referring now to FIGS. 1-6, the present invention features an inspection and retrieval device, more particularly a gooseneck hose 100 comprising retrieval claws. The gooseneck hose 100 comprises a semi-rigid flexible tube 110 having a first end 111, a second end 112, and an inner cavity. The semi-flexible tube 110 is sufficiently rigid to be twisted into a configuration and maintain that configuration until it is twisted again. Such semi-rigid flexible tubes are well known to one of ordinary skill in the art.

Spanning the length of the tube 110 (and disposed in the inner cavity of the tube 110) is a retractable wire 130. The retractable wire 130 has a first end 131 and a second end 132, the first end 131 extending past the first end 111 of the tube 110 and the second end 132 extending past the second end 112 of the tube 110.

Disposed on the first end 111 of the tube 110 is a housing 120 with a top housing cover 122. In some embodiments, the housing 120 is generally cylindrical. The housing cover 122 comprises a plurality of slots 124. Disposed inside the housing 120 is a camera device 140 for allowing a user to inspect a location. Attached to the first end 131 of the retractable wire 130 and disposed in the housing 120 is a retractable claw 150 for grabbing a small item in that particular location. The retractable claw 150 may comprise three or more tines 155 that can extend out of and retract into the housing 120 through the slots 124 (see FIG. 2). In some embodiments, one or more light components 145 (e.g., light emitting diodes) are disposed in the housing 120.

A gripping part 160 (e.g., a thumb ring, etc.) is disposed on the second end 132 of the wire 130. The gripping part 160 provides a way for a user to grip and move the wire 130. With the gripping part 160, the user can push and pull the wire 130 inside the tube 110, thus allowing the claw 150 to extend and to retract.

The camera device 140 is operatively connected to an electrical viewing device (e.g., a computer, to a camera, to a mobile phone, a handheld device, a specialized portable display device, and/or the like), for example via a cord. In some embodiments, the cord is wrapped in a retractable wheel 180. Retractable wheels 180 are well known to one of ordinary skill in the art. The cord can be extended from and retracted into the retractable wheel 180, which allows the user to choose the length of the cord. In addition, the retractable wheel 180 provides an organized means of storing a long cord. Disposed on the cord is an adaptor component 190 that allows for the connection to the electrical viewing device.

In some embodiments, the adaptor component 190 is a USB connector. However, the adaptor component 190 is not limited to this configuration. Many different types of connectors exist in the industry and are well known to one of ordinary skill in the art. For example, some conventional USB connectors known in the art are respectively known as A type, B type, and Mini type (see FIG. 3).

To use the gooseneck hose 100 of the present invention, a user can first plug the adaptor connector 190 into an electrical viewing device (e.g., a computer). He/she can then configure the tube 110 (e.g., bend the tube 110 or twist the tube 110) according to his/her needs. When the tube 110 is shaped appropriately, he/she can extend the tube into a particular location, such as a small space. Using the electrical viewing device that is connected to the camera device 140 via the cord 180 and adaptor component 190, the user can visualize small items in that particular location. When he/she has identified the item that he/she intends to collect, he/she can push the wire 130 so as to push the claw 150 out of the housing 120. The item can be grasped by the claw 150 (e.g., via the tines 155) as the user pulls the wire 130 back into the housing 120. He/she can remove the hose 100 from the location and release the item from the claw 150 by subsequently pushing on the wire 130 again.

In some embodiments, the electrical viewing device comprises hardware or software that is compatible with the camera device 140 so that the user can use the electrical viewing device to visualize what the camera is recording.

The hose 100 of the present invention may be constructed in a variety of sizes. For example, in some embodiments, the tube 110 is between about 6 to 18 inches in length as measured from the first end 111 to the second end 112, though longer tubes 110 may be employed without departing from the scope of the invention.

As used herein, the term "about" refers to plus or minus 10% of the referenced number. For example, an embodiment wherein the tube 110 is about 10 inches in length includes a tube 110 that is between 9 and 11 inches in length.

In some embodiments, electronic devices with hardware and software implementation designed by one that is skilled in the art, will enable real-time display of images or video signal captured by the camera, thereby enabling inspection of the desired location. A desired inspection at some other location may be carried out by positioning the gooseneck and the attached camera at any other location that is intended to be inspected.

The following the disclosures of the following U.S. Patents are incorporated in their entirety by reference herein: US Patent Application No. 2006/0108485; U.S. Pat. No. 6,847,394; U.S. Pat. No. 5,941,818; U.S. Pat. No. 5,513,827; U.S. Pat. No. 7,025,333.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A gooseneck hose device (100) comprising:
   (a) a semi-flexible tube (110);
   (b) a housing (120) with a top housing cover (122) disposed on a first end of the tube, wherein a camera device (140) and a light component (145) are disposed in the top housing cover (122), wherein the camera device (140) functions to allow a user to inspect a location, wherein a retractable claw (150) comprising three or more tines (155) is disposed in the housing (120), wherein the housing cover (122) comprises a plurality of slots (124), wherein each tine (1550) of the retractable claw (150) can be extended out of the housing through one slot (124) and retracted into the housing through one slot (124), wherein the retractable claw functions to grab an item in the location;
   (c) a wire (130) disposed in an inner cavity of the tube, wherein a first end (131) of the wire is attached to the retractable claw in the housing and a second end (132) of the wire extends past a second end of the tube; and
   (d) a gripping part (160) disposed on the second end (132) of the wire for allowing a user to grip and push or pull the wire inside the tube, thus allowing the retractable claw to extend and to retract;
wherein the camera device (140) is operatively connected to an electrical viewing device via a cord comprising an adaptor component (190), the cord being wrapped in a retractable wheel.

2. The hose device of claim 1, wherein the housing (120) is generally cylindrical.

3. The hose device of claim 1, wherein the gripping part (160) includes a thumb ring.

4. The hose device of claim 1, wherein the electrical viewing device includes a computer, a camera, a mobile phone, a handheld device, and a specialized portable display device.

5. The hose device of claim 1, wherein the adaptor component (190) is a USB connector.

6. A gooseneck hose device (100) consisting of:
   (a) a semi-flexible tube (110);
   (b) a housing (120) with a top housing cover (122) disposed on a first end of the tube, wherein a camera device (140) and a light component (145) are disposed in the top housing cover (122), wherein the camera device (140) functions to allow a user to inspect a location, wherein a retractable claw (150) comprising three or more tines (155) is disposed in the housing (120), wherein the housing cover (122) comprises a plurality of slots (124), wherein each tine (1550) of the retractable claw (150) can be extended out of the housing through one slot (124) and retracted into the housing through one slot (124), wherein the retractable claw functions to grab an item in the location;
   (c) a wire (130) disposed in an inner cavity of the tube, wherein a first end (131) of the wire is attached to the retractable claw in the housing and a second end (132) of the wire extends past a second end of the tube; and
   (d) a gripping part (160) disposed on the second end (132) of the wire for allowing a user to grip and push or pull the wire inside the tube, thus allowing the retractable claw to extend and to retract;
wherein the camera device (140) is operatively connected to an electrical viewing device via a cord comprising an adaptor component (190), the cord being wrapped in a retractable wheel.

* * * * *